(12) United States Patent
Wilson

(10) Patent No.: US 9,079,225 B2
(45) Date of Patent: Jul. 14, 2015

(54) SEAL CLEANING DEVICE

(75) Inventor: Ian Geoffrey Wilson, Cheltenham (AU)

(73) Assignee: Ian Geoffrey Wilson, Cheltenham (AU)

( * ) Notice: Subject to any disclaimer, the term of this patent is extended or adjusted under 35 U.S.C. 154(b) by 0 days.

(21) Appl. No.: 13/825,329

(22) PCT Filed: Oct. 11, 2011

(86) PCT No.: PCT/AU2011/001280
§ 371 (c)(1),
(2), (4) Date: Mar. 21, 2013

(87) PCT Pub. No.: WO2012/048365
PCT Pub. Date: Apr. 19, 2012

(65) Prior Publication Data
US 2013/0185885 A1 Jul. 25, 2013

(30) Foreign Application Priority Data

Oct. 11, 2010 (AU) ................................ 2010227083

(51) Int. Cl.
*B08B 1/00* (2006.01)
*B62J 99/00* (2009.01)
*F16F 9/36* (2006.01)

(52) U.S. Cl.
CPC . *B08B 1/005* (2013.01); *B08B 1/00* (2013.01); *B62J 99/00* (2013.01); *F16F 9/36* (2013.01); *B62J 2099/0093* (2013.01)

(58) Field of Classification Search
CPC ........ B08B 1/005; B08B 1/007; B08B 9/021; B08B 9/023; A47L 13/08; A47L 13/02
USPC ............................... 134/6; 15/236.07, 236.09
See application file for complete search history.

(56) References Cited

U.S. PATENT DOCUMENTS

| 1,643,336 | A | * | 9/1927 | Frost ............................... 30/169 |
| 5,437,074 | A | * | 8/1995 | White et al. .................... 15/105 |
| 6,481,041 | B1 | * | 11/2002 | Ingram ........................... 15/111 |
| 2004/0117932 | A1 | * | 6/2004 | Breeding et al. ......... 15/104.001 |

* cited by examiner

*Primary Examiner* — Michael Barr
*Assistant Examiner* — Rita Adhlakha
(74) *Attorney, Agent, or Firm* — Mark M. Friedman

(57) ABSTRACT

A seal cleaning device for seals located at the interface of the inner and outer tubes of a telescopically acting suspension or like unit; said device characterized in comprising a collar and at least one flexible cleaning projection; said cleaning projection adapted for insertion between a said seal and an outer surface of a said inner tube; said cleaning device adapted to removal of detritus from between a said seal and said inner tube.

12 Claims, 7 Drawing Sheets

Fig 1 – Prior Art

SEAL CLEANING DEVICE

Figure 1:
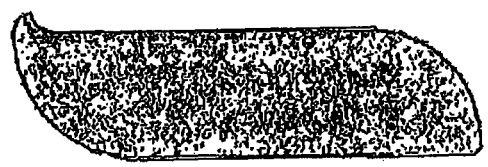

The present invention relates to special purpose cleaning devices and, more particularly, to a seal cleaning device for seals at the interface between the inner tube and outer tube of telescoping suspension assemblies and like devices.

BACKGROUND

Off-road motorcycles are designed for recreational riding and competition racing over natural terrain and man-made courses. Motorcross and Enduro are the two best know types of competition. Many manufacturers make these types of motorcycles, most notably Yamaha, BMW, Suzuki etc.

These off road motorcycles work in a very harsh environment and have many moving parts that are often covered with mud. Mud is essentially a fluid mixture of fine dirt and water. The dirt particles within the mud can vary from coarse sand, to very fine clay. The suspension components of, the motorcycle are the parts that suffer worst from constant exposure to this abrasive mix. These suspension components are attached to the wheels, (so are very exposed and close to the ground), and must travel through long distances to keep the wheels in contact with the terrain.

While it is possible to keep that mud out of many of the moving suspension pivots with conventional seals, the front forks of off road motorcycles are very difficult to protect. All off road motorcycles use telescopic sliding forks. These forks consist of one telescopic leg on each side of the front wheel. The internals of these telescopic legs are very complex and are filled with a myriad of valves, springs, and damping oil.

Almost all forks currently in production are commonly called USD, (short for Upside Down) forks. This is because the very first, (traditional), telescopic motorcycle forks used an inner tube rigidly mounted to the motorcycle, with the outer tube attached to the wheel. This kept the sliding portion of the fork high up on the motorcycle, and allowed a concertina style boot to be used over the exposed leg for protection. In recent years, however, all off-road motorcycle forks have been turned upside down. The larger diameter outside tubes are now clamped rigidly to the motorcycle steering frame, and the smaller diameter inner tubes are now attached to the wheel. This has been done primarily to increase the rigidity of the assembly. While there is a benefit in rigidity, the unfortunate consequence is that the exposed sliding portion of the leg is now below the fender of the motorcycle, very close to the front wheel. It is now in a position where it is very exposed to damage and mud, and is difficult to protect.

Additionally, as fork tube diameters have been increased in pursuit of increased rigidity, fork seal pressure against the leg has been reduced so as not to restrict fork movement.

The seals that stop mud and dirt entering the telescopic legs are fairly conventional oil seals. Two seals are used, an outer dust seal, and an inner oil seal. Because the free and rapid movement of the telescoping parts is vital for effective suspension control, it is critical that these seals are not so tight as to restrict the sliding is action. The obvious problem is that the looser the seal is on the sliding inner tuba, the less likely it is to keep dirt and water out of the easily damaged internals. The larger the fork inner tube diameter, the worse the compromise.

While it is theoretically possible to still cover the outside of these Upside Down telescoping forks with a 'concertina' style over-boot, these protective covers introduce, other problems. Although they have been used on some brands of motorcycle at some times, they are generally considered an unacceptable compromise. There are no production off-road motorcycles currently sold with this style of protectors.

In all cases, however, a rigid plastic stone shield is fixed in front of each fork leg, (normally at a distance of around 10 mm from the leg), to prevent hard objects contacting and damaging the critical sliding components. These stone guards do prevent some mud from contacting the legs, but they in turn make access to the legs for cleaning quite difficult. These stone guards are positioned away from the leg so that they do no not provide a place for mud to gather and abrade the leg.

The result is that in particular environments, fork seal life on off-road motorcycles is very limited. The situation is probably worst in hot muddy conditions where clay type mud quickly dries onto exposed sliding components. When this dried slurry is forced into the seal, often a small amount is pushed through the seal and inside the fork, tube. The first sign of ineffective seals is internal fork lubricating oil becoming visible around the seal area. If not addressed quickly, this oil will run down the fork tube and onto the brakes with dangerous consequences.

Very frequently, the initial leakage is associated with seals that are not actually damaged at that point, but are being prevented from sealing effectively due to the ingress of dirt and other debris. Removing this foreign material immediately allows the seal to work effectively again. If the abrasive contaminating material is left there, the seals and or suspension components are quickly damaged. Additionally, it is well known that the removal of any contaminants before a seal actually starts to leak will significantly extend the seal life.

Conventionally, the forks must be completely disassembled to allow access to the seals. This is an expensive and time consuming process that must be carried out in a well equipped workshop and requires significant technical expertise. It is known, however, that by prising the dust seal away, a thin piece of plastic sheet can sometimes be forced inside the oil seal to remove at least some of the dirt without disassembling the fork tube. This is seen more as an 'emergency' measure, rather than a mechanically sound way of removing the contaminants.

Unfortunately, because the outside of the fork tube is protected by the rigid plastic stone shield, this shield must be removed before the plastic can be run completely around the seal. As a result, this is rarely carried out as a preventative measure. Additionally, there is often not time to remove the stone guard when the oil is first noticed, and the motorcycle is ridden, (with subsequent damage). Even with the stone guards removed, it is difficult to run a piece of plastic sheet evenly around the seal. Available in the market are specially shaped plastic strips, as disclosed in published US patent application 2004/0117932 A1, and sold in motorcycle shops explicitly for this purpose, but these are little better than a piece of cut-up credit card or the like. The strip is illustrated in FIG. 1 of the drawings.

It is, an object of the present invention to address or at least ameliorate some of the above disadvantages.

The present invention comprises a tool that allows fork seals to be thoroughly cleaned very quickly without the removal of any protective guarding or disassembly of the fork leg.

Notes
1. The term "comprising" (and grammatical variations thereof) is used in this specification in the inclusive sense of "having" or "including", and not in the exclusive sense of "consisting only of".
2. The above discussion of the prior art in the Background of the invention, is not an admission that any information discussed therein is citable prior art or part of the common general knowledge of persons skilled in the art in any country.

BRIEF DESCRIPTION OF INVENTION

Accordingly, in a first broad form of the invention, there is provided a seal cleaning device for seals located at the interface of the inner and outer tubes of a telescopically acting suspension or like unit; said device characterised in comprising a collar and at least one flexible cleaning projection; said cleaning projection adapted for insertion between a said seal and an outer surface of a said inner tube; said cleaning device adapted to removal of detritus from between a said seal and said inner tube.

Preferably, said collar is a partly open, flexible collar formed as a single piece of plastic.

Preferably, said collar is formed as two pieces; said two pieces combining to substantially encircle said inner tube when fitted together for use.

Preferably, said partly open, flexible collar encircles a portion of said inner tube when in use; said portion greater than 180 degrees of the circumference of said inner tube; the opening of said partly open, flexible collar sufficient to allow said collar to be fitted into partially encircling position around said inner tube by pressure applied to said collar normal to the axis of said inner tube.

Preferably, said at least one flexible cleaning projection is a first flexible cleaning projection integrally formed on said collar; said first flexible cleaning projection projecting upwardly from a section of an upper rim of said partly open, flexible collar; said first flexible cleaning projection biased to fit closely against said outer surface of said inner tube when said partly open, flexible collar is in said partially encircling position around said inner tube for use.

Preferably, said first flexible cleaning projection extends to a pointed hook-shaped tip; said tip formed of material sufficiently thin and with a sharp upper edge to enable insertion of said tip between said inner tube and a lower lip of an oil seal disposed around said inner tube.

Preferably, said hook-shaped tip is adapted to dislodge detritus from between the inner circumference of said oil seal and said inner tube; said hook-shaped tip including a tapered shoulder guiding dislodged detritus away from said oil seal.

Preferably, said partly open, flexible collar is provided with a second, larger flexible cleaning projection; said second larger flexible cleaning projection extending downwardly from a section of a lower rim of said partly open, flexible collar; said second flexible cleaning projection of substantially similar shape to the shape of said first flexible cleaning projection; said second flexible cleaning projection biased to fit closely against said outer surface of a said inner tube when said partly open, flexible collar is in said partially encircling position around said inner tube for use.

Preferably, a hook-shaped tip of said second flexible cleaning projection is adapted for insertion between a said outer surface of said inner tube and a dust seal disposed around said inner tube.

Preferably, said partly open, flexible collar is provided with protrusions arranged at intervals around said collar; said protrusions providing grip for a user's thumb and fingers, thereby to rotate said partly open, flexible collar around said inner tube.

Preferably, said inner tube and outer tube comprise a front fork telescopically acting suspension unit of a motorcycle.

Preferably, said inner tube and outer tube comprise an hydraulic, pneumatic or electric linear actuator.

In another broad form of the invention, there is provided a method of cleaning seals at the interface of a inner tube and outer tube of a telescopically acting suspension or like unit; said method including the steps of
  (a) inserting a suitable tool between a dust seal and an oil seal located at said interface of said inner tube and outer tube,
  (b) sliding said dust seal along said inner tube away from said outer tube a sufficient distance to accommodate a partly open, flexible collar and projecting flexible cleaning projections of a seal cleaning device,
  (c) locating said cleaning device on said inner tube so that said partly open, flexible collar partially encircles said inner tube,
  (d) sliding said cleaning device along said inner tube so as to cause insertion of a first cleaning tip of said cleaning device between the outer surface, of said inner tube and an inner lip of an oil seal disposed at said interface, and
  (e) rotating said cleaning device around said inner tube sufficient to dislodge detritus accumulated between said oil seal and said outer surface of said inner tube.

Preferably, said method includes the further steps of:
  (a) sliding said cleaning device along said inner tube so as to cause insertion of a second cleaning tip of said device between the outer surface of said inner tube and said dust seal, and
  (b) rotating said cleaning device around said inner tube sufficient to dislodge detritus accumulated between said dust seal and said outer surface of said inner tube.

Preferably, said first and second cleaning tips are tips of a first upwardly projecting flexible cleaning projection and a second downwardly projecting flexible cleaning projection respectively; said cleaning projections formed integrally on an upper and lower rim respectively of said partly open, flexible collar.

Preferably, each of said first and second flexible cleaning projections include a said cleaning tip; said cleaning tip adapted for insertion between a said outer surface of said inner tube and a seal encircling said inner tube.

Preferably, said telescopically acting suspension or like unit is one of a pair of telescopically acting suspension units of the front fork of a motorcycle.

Preferably, said cleaning device permits cleaning of the seals of said pair of telescopically acting suspension units of a said motorcycle without disassembly of attached adjacent equipment from said telescopically acting suspension units.

BRIEF DESCRIPTION OP DRAWINGS

Figure 2:
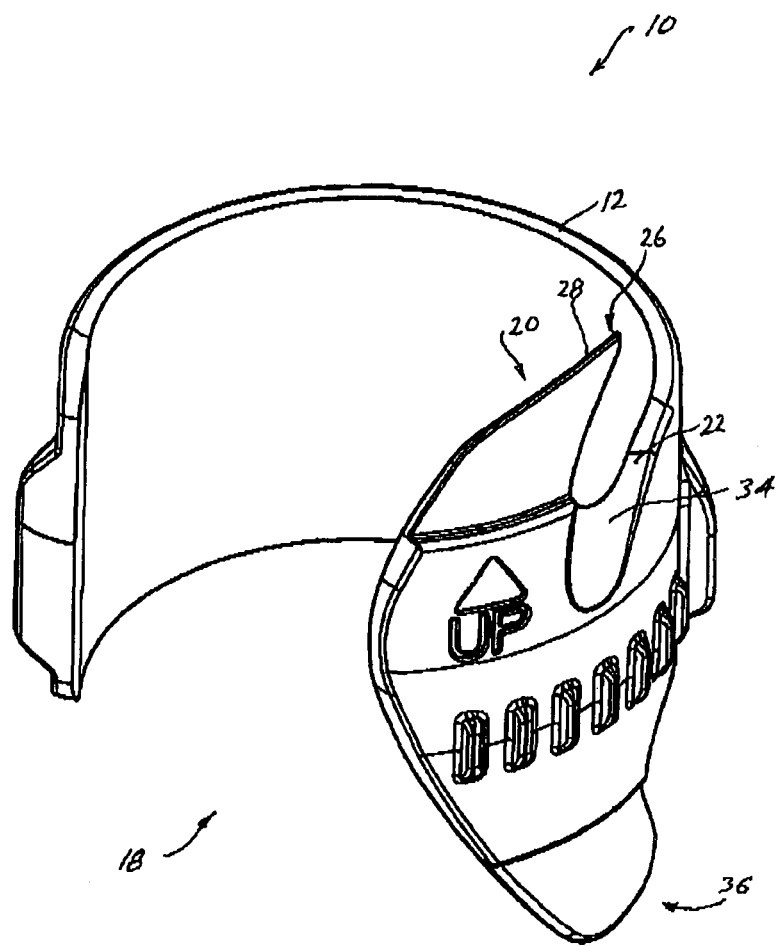
Figure 3:
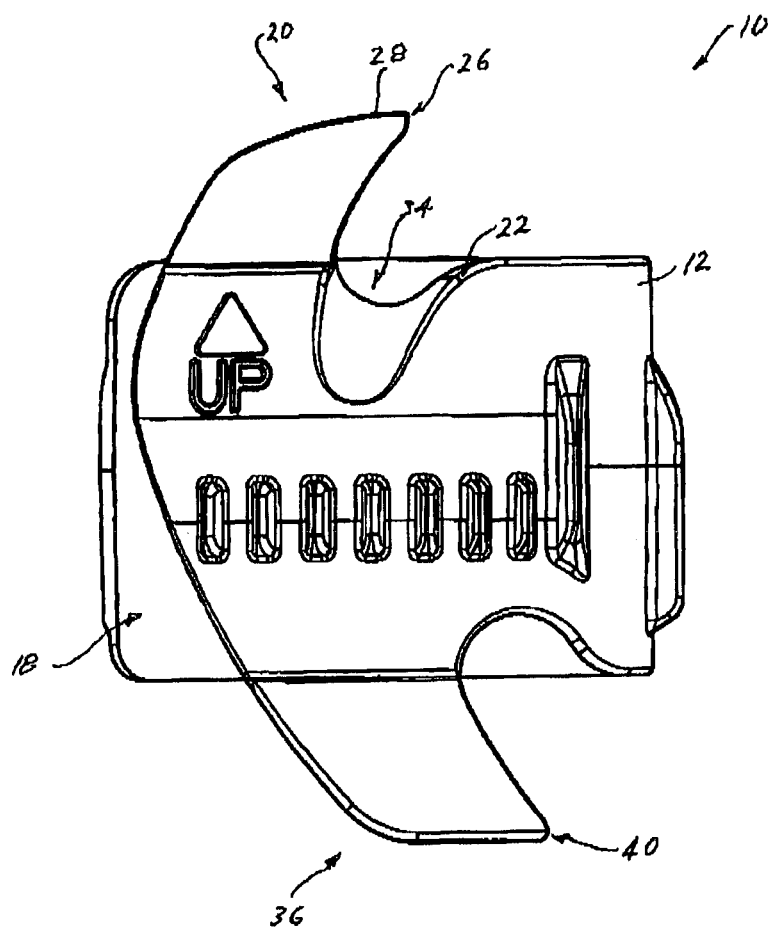
Figure 4:
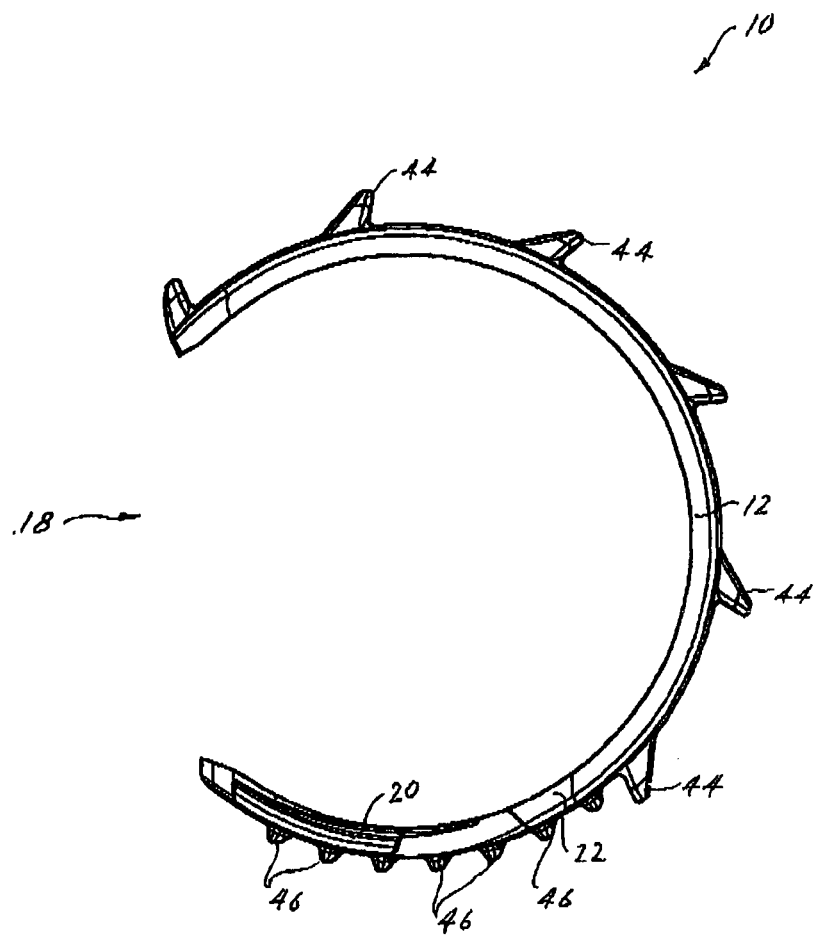
Figure 5:
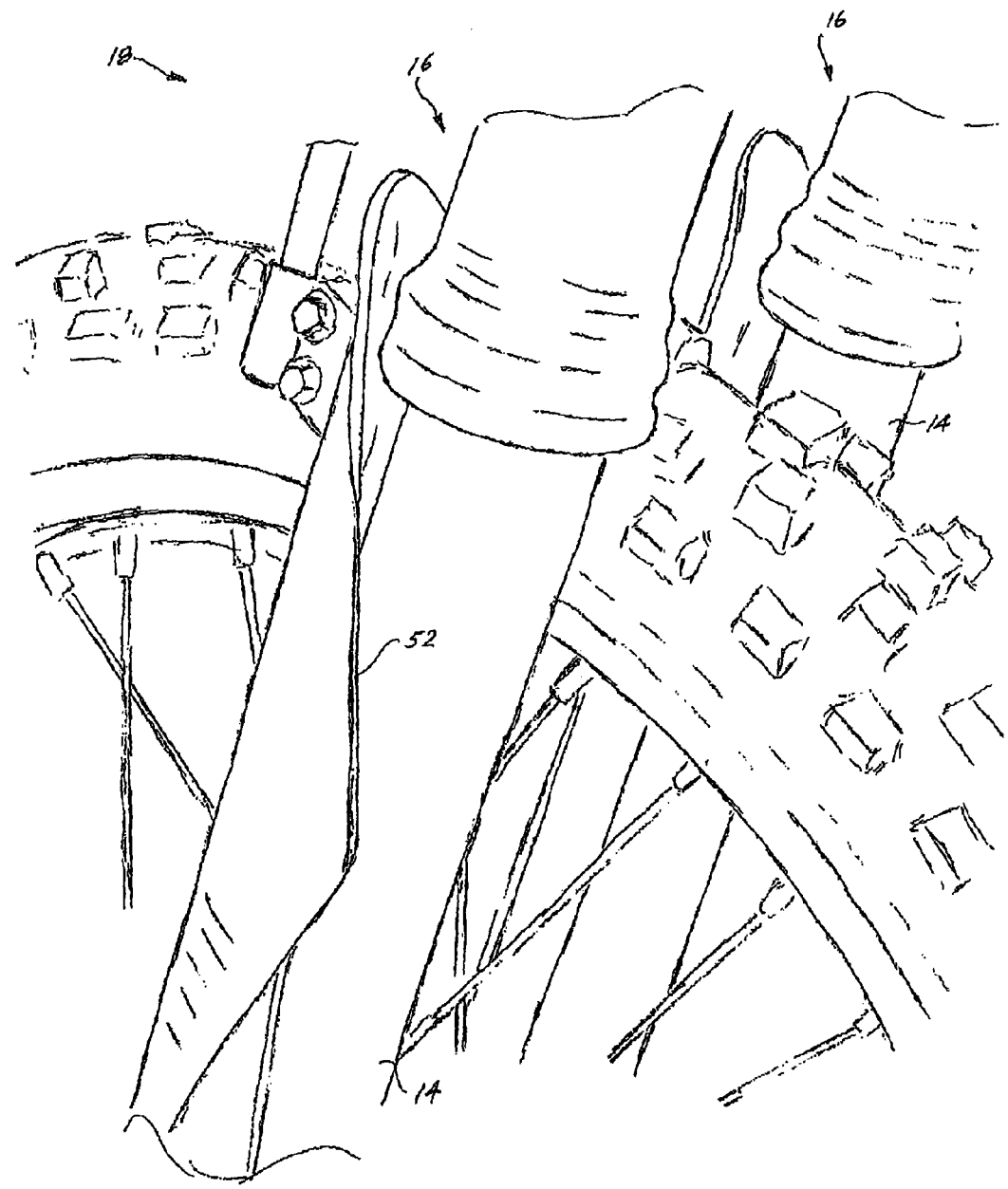
Figure 6:
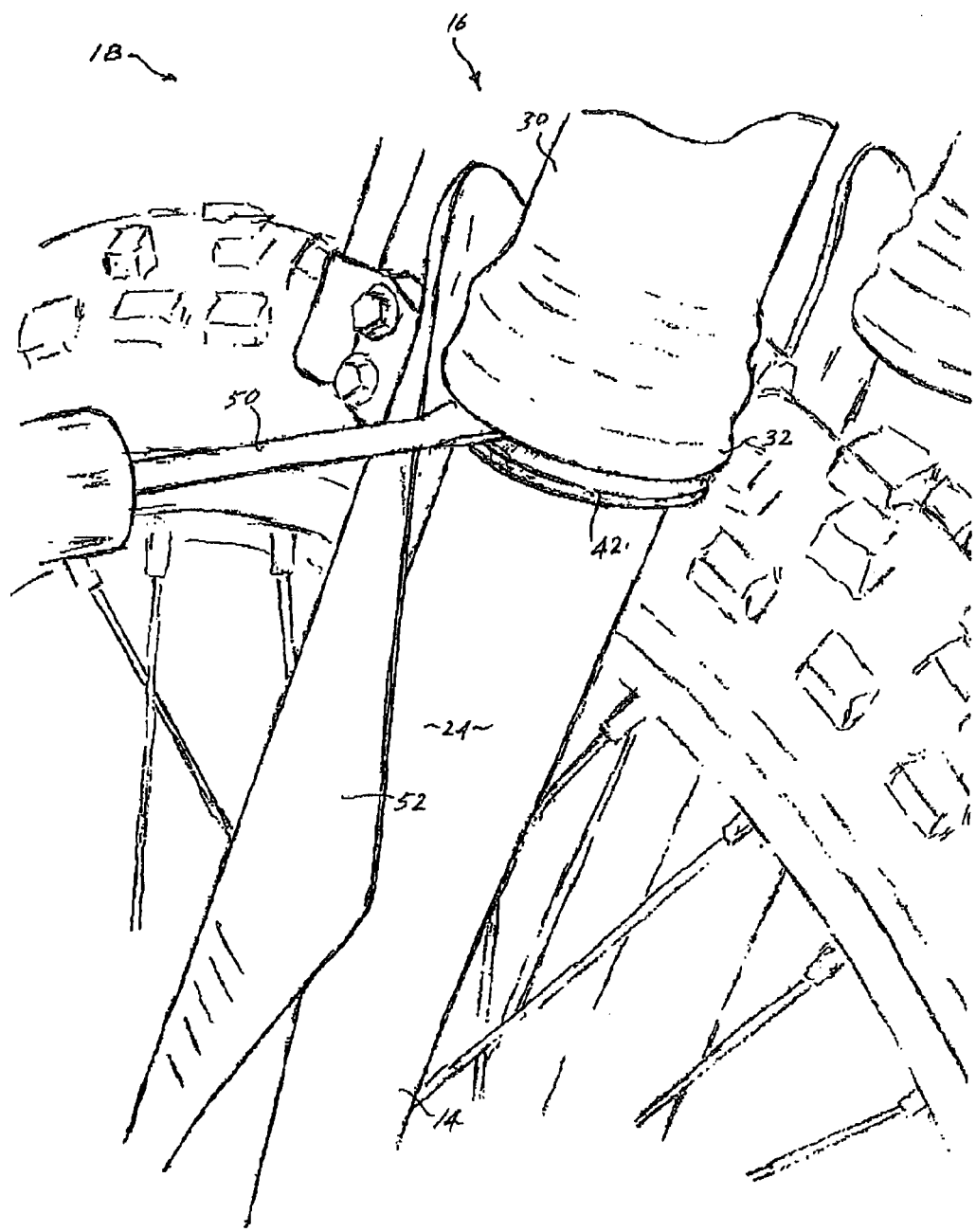

Embodiments of the present invention will now be described with reference to the accompanying drawings wherein:

FIG. 1 is a front view of a seal cleaning device according to prior art,

FIG. 2 is a perspective view of a preferred embodiment of a seal cleaning device according to present invention, FIG. 3 is a side view of the seal cleaning device of FIG. 2, FIG. 4 is a plan view of the seal cleaning device of FIGS. 2 and 3, FIG. 5 is a perspective view of a portion of the front of an off-road motorcycle showing part one of the telescopic suspension units of the front fork, FIG. 6 is a similar view to FIG. 3 showing a preparatory step in the use of the cleaning device of FIG. 2

Figure 7:
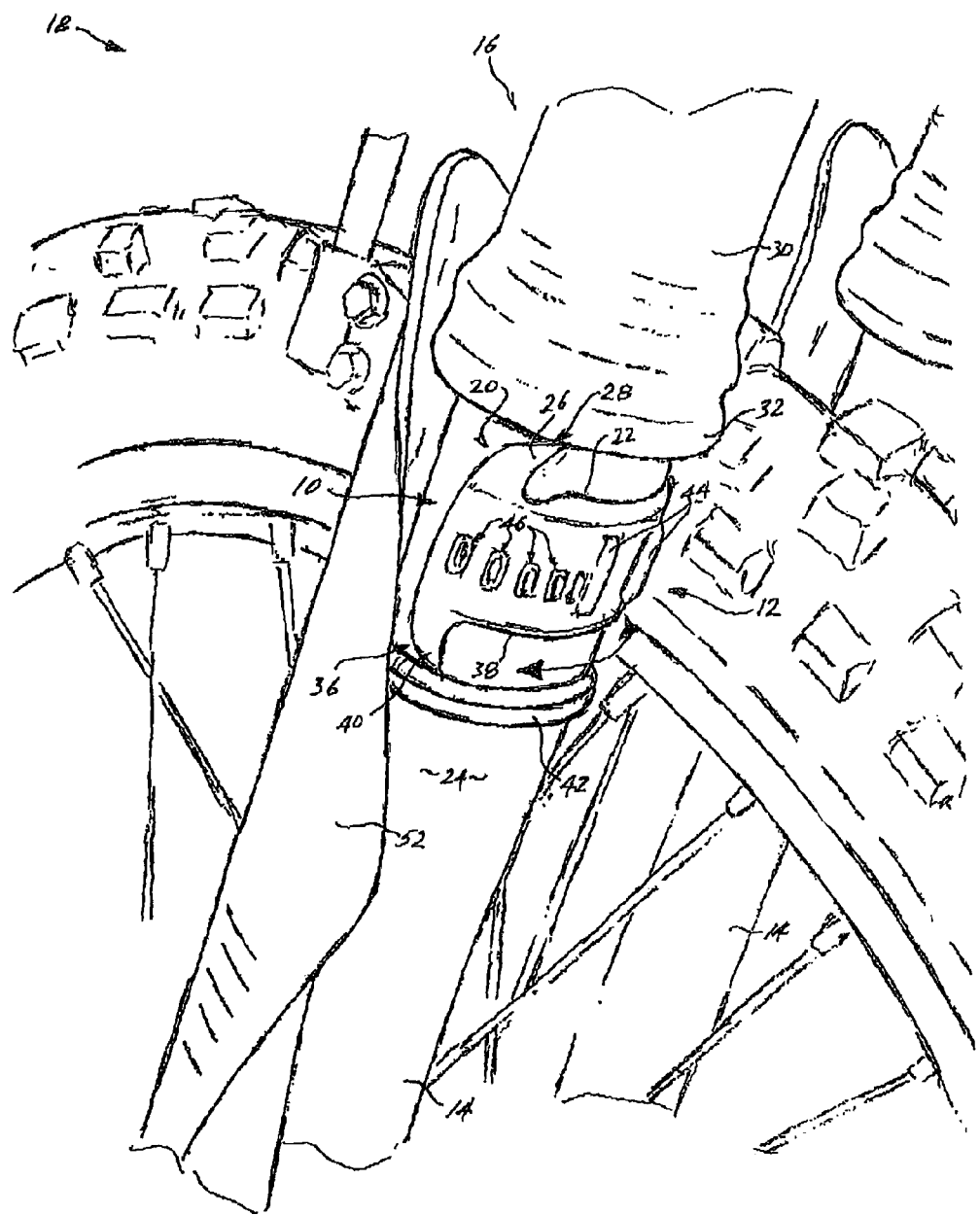

FIG. 7 shows the seal cleaning device of FIG. 2 positioned on one of the front fork suspension units of FIGS. 3 and 4,

DETAILED DESCRIPTION OF PREFERRED EMBODIMENTS

In this specification the terms inner tube and outer tube refer to the components of any telescopically acting suspension or like unit. Thus while these terms relate primarily to the front fork suspension units or legs of a motorcycle, the terms and the principles of the invention may equally be applied to the rod and housing of hydraulic, pneumatic or electric linear actuators for example.

FIG. 1 shows a seal cleaning device known in the prior art, as noted in the Background section above. It comprises a simple thin piece of flexible material which may be placed against the inner tube of a suspension unit and the hook shaped end forced between the outer surface of the inner tube and the seal.

With reference to FIGS. 2 to 4, in a preferred embodiment, a seal cleaning device 10 according to the invention, includes a partly open, flexible collar 12 formed, in this preferred embodiment, from a single piece of plastic material.

Collar 12 is designed to encircle a portion of the circumference of an inner tube 14 (as shown in FIG. 7) of a suspension unit 16 of an off-road motorcycle 18. The encircled portion is greater that 180 degrees of the circumference, with the flexibility of the collar 12 and the opening 18 in the collar, sufficient so as to allow it to be fitted into its partially encircling position around the inner tube 14 by pressure applied to the collar normal to the axis of the inner tube.

Collar 12 is provided with at least one flexible cleaning projection 20. This at least one, or first flexible cleaning projection 20, is integrally formed on the collar 12 and projects upwardly from a section of the upper rim 22. First flexible cleaning projection 20 is biased to fit closely against the outer surface 24 of the inner tube 14 when the collar 12 has been fitted into its partially encircling position around the inner tube.

As best seen in FIG. 2, first flexible cleaning projection 20 extends to a pointed hook-shaped tip 26. Tip 26 is formed of material sufficiently thin and with a sharp upper edge 28 to enable its insertion between the surface 24 of the inner tube 14 and a lower lip of the oil seal (not visible) disposed around the inner tube 14 and retained in the flared end 32 of the outer tube 30.

Again as best seen in FIG. 2, the hook-shaped tip 26 is so formed as to dislodge detritus from between the inner circumference of the oil seal and the surface 24 of the inner tube 14. Tip 26 includes a tapered shoulder 34 adapted to guiding dislodged detritus away from the oil seal.

Preferably, collar 12 is provided with a second, larger flexible cleaning projection 36, in this case projecting downwardly from a section of the lower rim 36 of the collar. This second larger flexible cleaning projection 36 is substantially similar in shape to the shape of the first flexible cleaning projection 20. As with the first flexible cleaning projection 20, the second cleaning projection 36 is also biased to fit closely against the surface 24 of the inner tube 14.

The hook-shaped tip 40 of this second cleaning projection 36, is adapted for insertion between the surface 24 of the inner tube 14 and a dust seal 42 disposed around the inner tube 14, once the dust seal 42 has been moved to a suitable position (see FIG. 6) as will be more fully described below. The second cleaning projection 36 is larger and preferably somewhat stiffer than the first cleaning projection 20, to allow for the less resilient nature of the dust seal 42.

Collar 12 is provided with protrusions 44 and 46 arranged at intervals around the collar 12, which provide a grip for the thumb and fingers of a user (not shown) and which facilitate the rotation of the collar 12 around the inner tube 14.

Collar 12 may be provided in one, or preferably two sizes, to cater for the range of diameters of the inner tubes of the front fork suspension units 16 of off-road motor cycles. It, is preferable, though not essential, that the collar is a close fit around the tube; the flexibility and the inward biasing of the cleaning tips 20 and 36 ensuring that the tips may be readily introduced between the inner circumference of the seals and the tube.

In another preferred embodiment of the cleaning device of the invention, a collar of a cleaning device, may be provided in two parts. In this arrangement collars may be provided to suit particular inner tube diameters with the collar completely encircling the inner tube when the two parts of the collar are assembled together for use.

The parts may be clipped together by snap-fitting ends provided at the abutting ends of the semi-circular parts. Alternatively, the parts may be held in position around the inner tube by a spring clip in the manner of a bicycle clip for example. In this embodiment also, there is provided at least a first, and preferably also a second, cleaning projection as described for the first preferred embodiment above.

In Use

Referring now to FIGS. 6 and 7, the oil seal of a front fork suspension unit 16, is protected by a dust seal 42 which is positioned abutting the outer face of the oil seal. Both oil seal and dust seal are typically retained in a flared recessed end 32 of the outer tube 30 of the suspension unit 16.

To clean the seals, the dust seal 42 is prised out of the recessed end of the outer tube, for example with a screw driver 50, and slid away from the oil seal a sufficient distance to allow the for the seal cleaning device 10 to be snapped (or fitted) around the inner tube 14 between the re-located dust seal 42 and the oil seal (which remains in its retained position within the flared end of the outer tube 16). The collar 12 is then slid upwards to force the tip 26 of the upwardly extending first flexible cleaning projection 20 under the lower lip of the oil seal. The collar 12 can then be easily rotated so that the tip passes completely around the inner surface of the oil seal, pulling any trapped detritus out of the seal.

It will be understood from FIG. 7 that rotation of the seal cleaning device 10 is easily accomplished by means of the projections 44 and 46 provided on the collar 12, so that the stone guard 52 may be left in position during the cleaning operation.

To clean the dust seal 42, the seal cleaning device 10 is simply slid downward to force the tip 40 of the second, larger flexible cleaning projection 36 between the surface 24 of the inner tube 14 of the suspension unit 16 and the internal circumference of the dust seal 42. If desired, the oil seal and dust seal cleaning can be accomplished simultaneously. In that case once the tip 26 of the first flexible cleaning projection 20 has been inserted under the lip of the oil seal, the dust seal 42 is slid up to engage the tip 40 of the second, larger flexible cleaning projection 36 with the dust seal. Rotating the collar 12 then cleans both seals.

The tip of the first flexible cleaning projection must be very thin (with a sharp edge as described above) so that it can be easily slid under the lip of the oil seal. Because the collar 12 wraps around the inner tube 14, and the flexible cleaning projections 20 and 36 conform to the curvature of the collar 12, the tips of the flexible cleaning projections can be thin, yet wide enough to have the necessary strength and durability. The biasing of the flexible cleaning projections, described above, ensures that when the collar is in position, they are pressed firmly against the surface 24 of the inner tube 14 at the tips 26 and 40 ensuring the tips can be inserted between the seals and the inner tube. This biasing is an important feature of the invention and ensures that the tip of the first cleaning projection 20 in particular will not damage the softer and more fragile oil seal.

The inner sliding fork tubes 14, that the seal cleaning device 10 of the invention needs to fit around, vary somewhat in diameter. Mast forks are manufactured by specialist manufacturers, such as Marzocchi in Italy, and KYB and Showa in Japan. Fork inner tube diameters are in two distinct ranges. These are 42 mm-44 mm for 80 cc machines, and 48 mm-50 mm for all full sized motorcycles. It is the object of this invention to preferably accommodate all sizes of fork tubes with one seal cleaning device according to the invention. It will be obvious however to those skilled in the art that at least two sizes could be provided, one for 80 cc machines, and one for all larger motorcycles. Similarly, the seal cleaning device of the present invention could be made in a number of other specialist sizes to suit other applications where foreign matter is likely to intrude into the seals of telescoping inner and outer tube devices.

The above describes only some embodiments of the present invention and modifications, obvious to those skilled in the art, can be made thereto without departing from the scope of the present invention.

The invention claimed is:

1. A seal cleaning device for seals located at the interface of an inner tube and an outer tube of a telescopically acting suspension unit, without disassembly of said suspension unit and associated guarding; said seal cleaning device characterized in comprising a flexible collar and at least one flexible cleaning projection extending from an upper rim of said flexible collar, said flexible collar encircling a portion of said inner tube when in use, said portion being greater than 180 degrees of the circumference of said inner tube; said at least one flexible cleaning projection adapted for insertion between one of said seals and an outer surface of said inner tube; said cleaning device adapted to removal of detritus from between said seal and said inner tube; said first flexible cleaning projection extending to a pointed hook-shaped tip; and wherein an opening in said flexible collar is sufficient to pass therethrough said inner tube thereby assembling said flexible collar into a partially encircling position around said inner tube when pressure is applied to said flexible collar normal to the axis of said inner tube; said cleaning projection then lying in close contact with said inner tube so as to allow insertion of said at least one flexible cleaning projection between said seal and said outer surface; and, wherein said flexible collar is provided with a second flexible cleaning projection; said second flexible cleaning projection extending downwardly from a section of a lower rim of said flexible collar; said second flexible cleaning projection of substantially similar shape to the shape of said first flexible cleaning projection; said second flexible cleaning projection arranged to fit closely against said outer surface of said inner tube when said partly open, flexible collar is in said partially encircling position around said inner tube for use.

2. The device of claim 1 wherein said flexible collar is a partly open, flexible collar formed as a single piece of plastic.

3. The device of claim 1 wherein said at least one flexible cleaning projection is a first flexible cleaning projection integrally formed on said flexible collar; said first flexible cleaning projection projecting upwardly from a section of an upper rim of said partly open, flexible collar, said first flexible cleaning projection arranged to fit closely against said outer surface of said inner tube when said partly open, flexible collar is in said partially encircling position around said inner tube for use.

4. The device of claim 3 wherein said hook-shaped tip formed of material sufficiently thin and with a sharp upper edge to enable insertion of said hook-shaped tip between said inner tube and a lower lip of an oil seal disposed around said inner tube.

5. The device of claim 4 wherein said hook-shaped tip is adapted to dislodge detritus from between the inner circumference of said oil seal and said inner tube; said hook-shaped tip including a tapered shoulder guiding dislodged detritus away from said oil seal.

6. The device of claim 1 wherein a hook-shaped tip of said second flexible cleaning projection is of a thickness to allow insertion between a said outer surface of said inner tube and a dust seal disposed around said inner tube.

7. The device of claim 1 wherein said partly open, flexible collar is provided with protrusions arranged at intervals around said flexible collar; said protrusions providing grip for a user's thumb and fingers, thereby to rotate said partly open, flexible collar around said inner tube.

8. The device of claim 1 wherein said flexible collar of said cleaning device is provided in a range of diameters to cater for a range of inner tube diameters; said inner tube and outer tube comprising one telescopically acting suspension unit of a front fork of a motorcycle.

9. The device of claim 1 wherein said inner tube and outer tube comprise respectively a piston or actuator rod of an hydraulic ram, a pneumatic cylinder or an electric linear actuator.

10. A method of cleaning seals at an interface of an inner tube and an outer tube of a telescopically acting suspension unit; said method including the steps of:
    (a) inserting a suitable tool between a dust seal and an oil seal located at said interface of said inner tube and outer tube,
    (b) sliding said dust seal along said inner tube away from said outer tube a sufficient distance to accommodate a partly open, flexible collar and projecting flexible cleaning projections of a seal cleaning device,
    (c) forcing said seal cleaning device onto said inner tube without disassembly of said suspension unit and associated guarding by said inner tube passing through an opening of said partly open, flexible collar so that said partly open, flexible collar partially encircles said inner tube,
    (d) sliding said cleaning device along said inner tube so as to cause insertion of a hook-shaped tip of a first cleaning projection of said cleaning device between the outer surface of said inner tube and an inner lip of an oil seal disposed at said interface, and
    (e) rotating said cleaning device around said inner tube sufficient to dislodge detritus accumulated between said oil seal and said outer surface of said inner tube; and wherein said first cleaning tip and a second cleaning tip are tips of a first upwardly projecting flexible cleaning projection and a second downwardly projecting flexible cleaning projection respectively; said cleaning projections formed integrally on an upper and lower rim respectively of said partly open, flexible collar.

11. The method of claim 10 wherein said method includes the further steps of: said
    (a) sliding said cleaning device along said inner tube so as to cause insertion of second cleaning tip of said device extending from a lower edge of said partly open flexible collar, between the outer surface of said inner tube and said dust seal, and (b) rotating said cleaning device around said inner tube sufficient to dislodge detritus accumulated between said dust seal and said outer surface of said inner tube.

12. The method of claim 10 wherein said telescopically acting suspension unit is one of a pair of telescopically acting suspension units of a front fork of a motorcycle.

* * * * *